United States Patent
Hirata et al.

[11] Patent Number: 6,097,016
[45] Date of Patent: Aug. 1, 2000

[54] COOKING APPARATUS HAVING DISPLAY UNIT AND ITEM SELECTION UNIT

[75] Inventors: Kengo Hirata, Kitakatsuragi-Gun; Shyuzi Kawaguchi; Tadahito Ikeda, both of Osaka; Yutaka Takashige, Kishiwada; Hideaki Otani, Tondabayashi; Kyoko Ito, Yao, all of Japan

[73] Assignee: Sharp Kabushiki Kaisha, Osaka, Japan

[21] Appl. No.: 09/281,002

[22] Filed: Mar. 30, 1999

[30] Foreign Application Priority Data

Mar. 30, 1998 [JP] Japan .................................. 10-083712
Aug. 19, 1998 [JP] Japan .................................. 10-232944

[51] Int. Cl.$^7$ ...................................................... H05B 6/68
[52] U.S. Cl. ............................................................. 219/720
[58] Field of Search .................................... 219/720, 702, 219/713, 714, 716, 721, 725, 506; 340/365; 341/23; 99/325; 364/477

[56] References Cited

U.S. PATENT DOCUMENTS

| | | | |
|---|---|---|---|
| 4,035,195 | 7/1977 | Podlas | 507/113 |
| 4,309,584 | 1/1982 | Terakami | 219/720 |
| 4,447,692 | 5/1984 | Mierzwinski | 219/720 |
| 4,628,351 | 12/1986 | Heo | 348/156 |
| 4,841,125 | 6/1989 | Edamura . | |
| 5,272,300 | 12/1993 | Edamura | 219/702 |
| 5,274,209 | 12/1993 | Edamura | 219/714 |
| 5,579,002 | 11/1996 | Iggulden et al. | 341/23 |
| 5,704,277 | 1/1998 | Yung . | |
| 5,818,446 | 10/1998 | Bertram et al. | 345/334 |
| 5,884,249 | 3/1999 | Namba et al. | 704/9 |

FOREIGN PATENT DOCUMENTS

| | | |
|---|---|---|
| 482 578 A1 | 10/1991 | European Pat. Off. . |
| 550 312 A2 | 12/1992 | European Pat. Off. . |
| 818 942 A2 | 7/1997 | European Pat. Off. . |
| 59-183220 | 10/1984 | Japan . |
| 9318074 | 12/1997 | Japan . |
| 10-47683 | 2/1998 | Japan . |
| 10-47684 | 2/1998 | Japan . |
| 10-47685 | 2/1998 | Japan . |
| 10-47686 | 2/1998 | Japan . |
| 9-171656 | 1/1999 | Japan . |

*Primary Examiner*—Teresa Walberg
*Assistant Examiner*—Jeffrey Pwu

[57] ABSTRACT

A cooking apparatus has a display and a selector for selecting an item displayed on the display. The display displays one screen after another so as to correspond to one item after another selected thereon. The cooking apparatus further has a bookmark attachment requester for requesting attachment of a bookmark to a specific screen displayed on the display unit, a storage for storing data related to the bookmarked screen, a bookmarked screen display requesting member for requesting display of the bookmarked screens and a display controller for displaying the bookmarked screen in accordance with the data stored in the storage in response to a request from the bookmarked screen display requester.

23 Claims, 19 Drawing Sheets

Fig. 3A

| | |
|---|---|
| cooking ⇨ | ● |
| warming ⇨ | ○ |
| thawing ⇨ | ○ |
| cooking guides ⇨ | ○ |

| automatic cooking | |
|---|---|
| cookies ⇨ | ● |
| cake ⇨ | ○ |
| gratin ⇨ | ○ |
| meats ⇨ | ○ |

| | |
|---|---|
| beans ⇨ | ○ |
| vegetables ⇨ | ○ |
| fried foods ⇨ | ○ |
| hints on cooking ⇨ | ○ |

| ⌂ cookies 1 | |
|---|---|
| cut-out cookies ⇨ | ● |
| squeezed-out cookies ⇨ | ○ |
| simple cookies ⇨ | ○ |
| peanut cookies ⇨ | ○ |

74a

| ⌂ cookies 2 | |
|---|---|
| chocolate cookies ⇨ | ○ |
| coconut cookies ⇨ | ○ |
| | ○ |
| | ○ |

74b

75a

| ⌂ cake 1 | |
|---|---|
| sponge cake ⇨ | ● |
| chocolate cake ⇨ | ○ |
| cheese cake ⇨ | ○ |
| roll cake ⇨ | ○ |

75b

| ⌂ cake 2 | |
|---|---|
| pound cake ⇨ | ○ |
| | ○ |
| | ○ |
| | ○ |

76a

| ⌂ hints on cooking | |
|---|---|
| handy a-la-carte dishes ⇨ | ○ |
| dishes from all over the world ⇨ | ○ |
| dishes for children ⇨ | ○ |
| notes on cooking ⇨ | ● |

Fig. 3D

74c
| cut-out cookies | |
|---|---|
| quantity 38pcs. ⇨ | ● |
| 76 pcs. ⇨ | ○ |
| | ○ |
| | ○ |

75c
| sponge cake | |
|---|---|
| 1- floor baking ⇨ | ● |
| 2 - floor baking ⇨ | ○ |
| | ○ |
| | ○ |

76b
| notes on cooking | |
|---|---|
| vinegar/dressing ⇨ | ○ |
| pouring/dripping sauces ⇨ | ○ |
| advice on cooking ⇨ | ○ |
| tips on frying | ● |

Fig. 3E

74d
| cookies, 38pcs. | |
|---|---|
| baking ⇨ | ● |
| recipe ⇨ | ○ |
| | ○ |
| | ○ |

75d
| sponge, 1 floor | |
|---|---|
| baking ⇨ | ● |
| recipe ⇨ | ○ |
| | ○ |
| | ○ |

76c
| tips on frying | |
|---|---|
| basics of tempura ⇨ | ● |
| shrimp tempura ⇨ | ○ |
| tips on mixture fries ⇨ | ○ |
| tips on deep frying ⇨ | ○ |

Fig. 3F

74e
| baking, cookies, 38pcs. | |
|---|---|
| baking: brown ⇨ | ○ |
| standard ⇨ | ● |
| light ⇨ | ○ |
| select and press "START" | ○ |

74f
| recipe, cut-out cookies | |
|---|---|
| ingredients ⇨ | ○ |
| preparing dough ⇨ | ○ |
| forming ⇨ | ○ |
| baking ⇨ | ○ |

75e
| baking, 1 floor | |
|---|---|
| baking: brown ⇨ | ○ |
| standard ⇨ | ● |
| light ⇨ | ○ |
| select and press "START" | ○ |

75f
| recipe, sponge, 1 floor | |
|---|---|
| ingredients ⇨ | ○ |
| preparing dough ⇨ | ○ |
| forming ⇨ | ○ |
| baking ⇨ | ○ |

76d
| basics of tempura | |
|---|---|
| ingredients of batter ⇨ | ● |
| preparing batter ⇨ | ○ |
| how to fry ⇨ | ○ |
| | ○ |

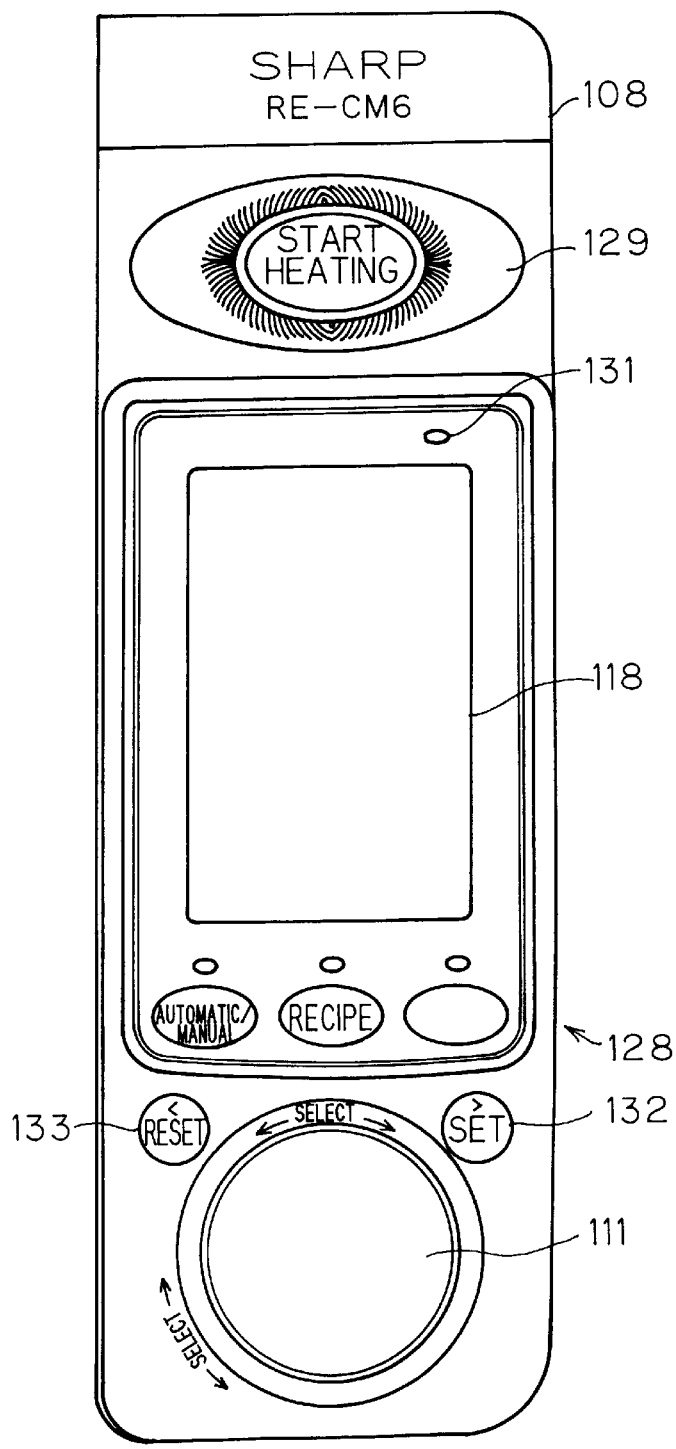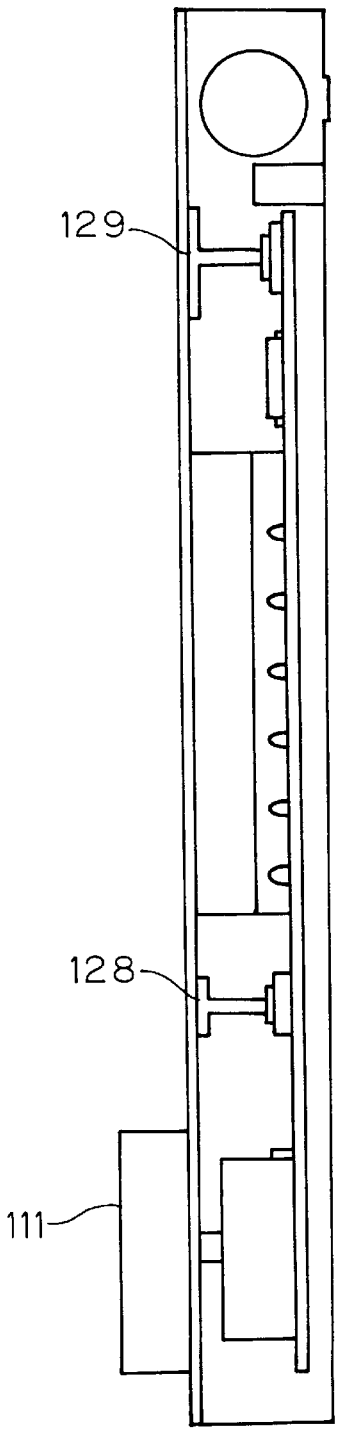
Fig.19 PRIOR ART
Fig.20 PRIOR ART

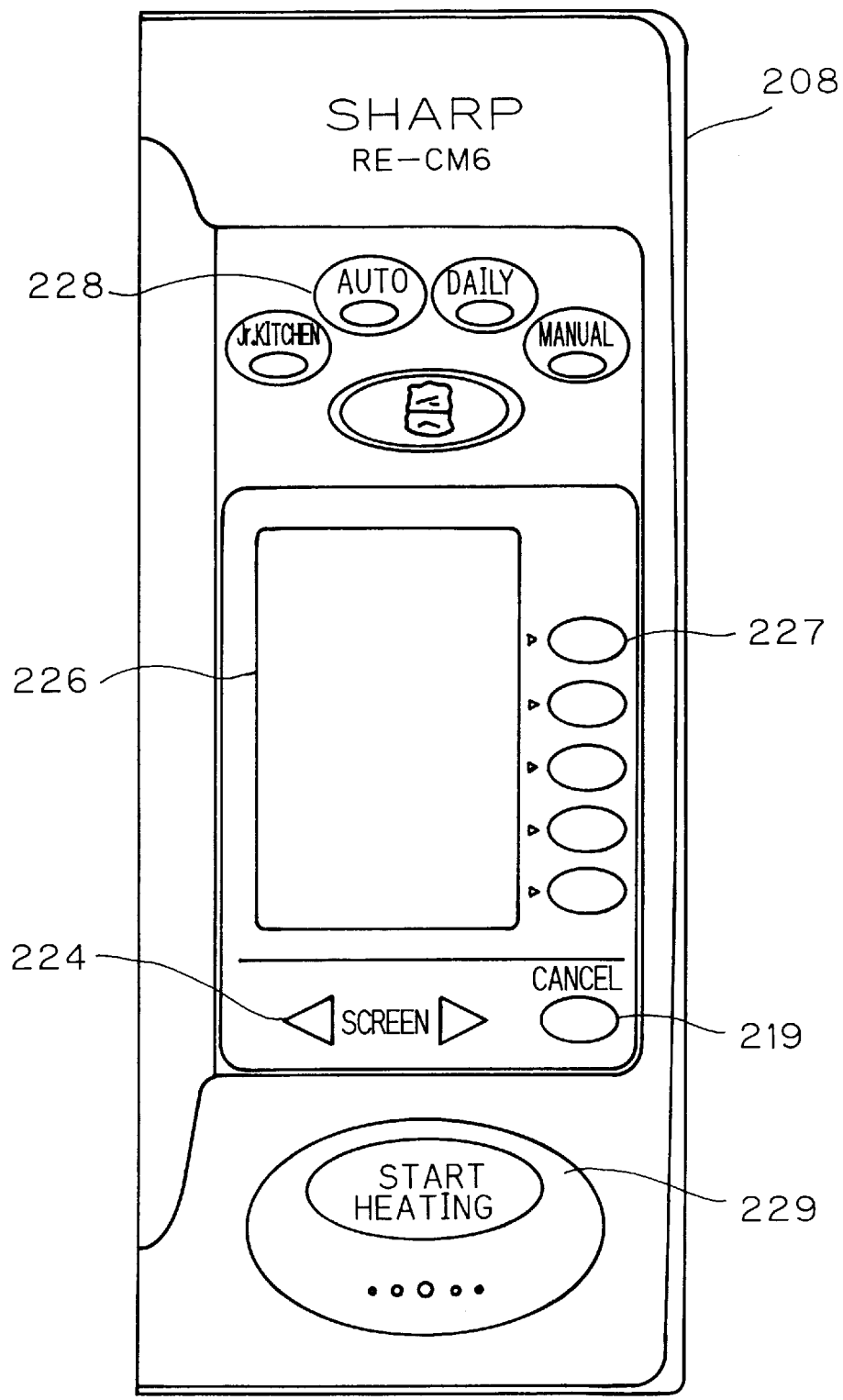

COOKING APPARATUS HAVING DISPLAY UNIT AND ITEM SELECTION UNIT

BACKGROUND OF THE INVENTION

1. Field of the Invention

The present invention relates to a cooking apparatus such as a microwave oven, and particularly to a cooking apparatus that allows cooking to be performed in a manner fit for the material or menu to be cooked in accordance with selections made on an operation panel.

2. Description of the Background Art

How a conventional cooking apparatus such as a microwave oven is operated is disclosed in Japanese Patent Application No. H9-17156. The cooking apparatus disclosed therein has an operation panel 108 as shown in FIGS. 19 and 20, which are a front view and a sectional side view, respectively, thereof. As shown in these figures, on the operation panel 108 are arranged a start key 129 for starting cooking, a liquid crystal display 118 for displaying the conditions and progress of cooking, and a rotary encoder 111. Below the liquid crystal display 118 are arranged switch keys 128 that are individually operated to switch between manual and automatic cooking, to display recipes and a rough (high-level) grouping of cooking methods, and to perform other functions. Moreover, the operation panel 108 incorporates a rechargeable battery (not shown) and has a charge lamp 131 for indicating the remaining battery capacity so that the cooking apparatus proper can be operated by remote control even when the operation panel 108 is detached therefrom.

On a screen displayed on the liquid crystal display 118 to show characterbased data, a desired item can be highlighted by rotating the rotary encoder 111 and then selected by pressing a set button 132. By repeating such selection, it is possible to switch from one screen to another to show various contents such as cooking guides and middle- and low-level groupings of cooking methods, and thereby select a suitable cooking cycle. An already selected item can be canceled by pressing a reset button 133.

Japanese Laid-Open Patent Applications Nos. H10-47683, H10-47684, H10-47685, and H10-47686 disclose cooking apparatuses having an operation panel as shown in FIG. 21. On this operation panel 208 are arranged a start key 229 for starting cooking, a liquid crystal display 226 for displaying the conditions and progress of cooking, and switch keys 228 that are individually operated to display a high-level grouping of commonly used cooking methods on the liquid crystal display 226.

By the side of the liquid crystal display 226 are arranged a plurality of selection keys 227 so that, on a screen displayed on the liquid crystal display 226 to show character-based data, a desired item can be selected by pressing the corresponding one of the selection keys 227. By repeating such selection, it is possible to switch from one screen to another to show various contents such as cooking guides and middle- and low-level groupings of cooking methods. Below the liquid crystal display 226 are arranged a cancellation key 219 for canceling an already selected item, and arrow keys 224 for switching to the previous and next screens, respectively.

Japanese Laid-Open Patent Application No. S59-183220 discloses a cooking apparatus whose operation and display units incorporate a liquid crystal display device having transparent touch electrodes so that, when a portion of the screen displayed on the liquid crystal display is operated to select a desired operation, the selected operation is indicated by changing the state of that portion of the screen.

However, with the conventional cooking apparatuses described earlier, to reach a target screen showing a specific cooking menu or a specific cooking guide, it is necessary to display one screen after another on the liquid crystal display by making selections in due order, i.e. from a high-level grouping to a middle-level grouping and then to a low-level grouping, by operating the encoder 111 (see FIG. 19) or the selection key 227 (see FIG. 21). Performing similar operations one after another makes reaching a target screen troublesome and time-consuming, and thus spoils user-friendliness.

On the other hand, in the cooking apparatus disclosed in Japanese Laid-Open Patent Application No. S59-183220, it is possible to indicate a selected operation by changing the state of the corresponding portion of the screen displayed on the liquid crystal display, but it is difficult to secure on the liquid crystal display a sufficiently large area on which to display a screen that allows selection from a sufficiently large number of cooking menus and cooking guides.

SUMMARY OF THE INVENTION

An object of the present invention is to provide a user-friendly cooking apparatus that allows easy selection of a cooking menu or a cooking guide.

To achieve the above object, according to one aspect of the present invention, a cooking apparatus which has a display unit and a selector for selecting an item displayed on the display unit and in which the display unit displays one screen after another so as to correspond to one item after another selected thereon is provided with: a bookmark attachment requesting member for requesting attachment of a bookmark to a specific screen displayed on the display unit; a memory for storing data related to the bookmarked screen; a bookmarked screen display requesting member for requesting display of the bookmarked screen; and a display controller for displaying the bookmarked screen in accordance with the data stored in the memory in response to a request from the bookmarked screen display requesting member.

According to another aspect of the present invention, a cooking apparatus which has a display unit and a selector for selecting an item displayed on the display unit and in which the display unit displays one screen after another so as to correspond to one item after another selected thereon is provided with: an index key for displaying, as items displayed on the display unit, a list of names of groups into which cooking menus are classified by their first letter; and a display controller for displaying a list of cooking menus belonging to a group selected by the selector.

According to still another aspect of the present invention, in a cooking apparatus which has an operation panel including a display unit and a data entry unit and in which the data entry unit controls switching of screens displayed on the display unit, the data entry unit has data entry keys that are individually operated and has a transparent touch panel laid over the front surface of the display unit to allow cooking conditions to be entered by interactively switching the screens displayed on the display unit by operating the touch panel.

In this cooking apparatus, the touch panel is composed of: a transparent substrate having a first transparent electrode formed on a surface; and a flexible transparent film having a second transparent electrode formed on a surface. The transparent film is laid over the transparent substrate and bonded thereto at their edges, with an air layer secured in between and with the first and second transparent electrodes facing each other. Moreover, a connector for connecting one end of a key cable whose other end is connected to a control circuit is provided in the touch panel, and an air passage is provided near the connector to allow air to flow freely into and out of the air layer.

BRIEF DESCRIPTION OF THE DRAWINGS

This and other objects and features of the present invention will become clear from the following description, taken in conjunction with the preferred embodiments with reference to the accompanied drawings in which:

FIGS. 3A–F, hereinafter referred to as FIG. 3, are diagrams illustrating the operation flow of the cooking apparatus of the first embodiment;

FIG. 19 is a front view of the operation panel of a conventional cooking apparatus;

FIG. 20 is a sectional side view of the same operation panel as shown in FIG. 19; and FIG. 21 is a front view of the operation panel of another conventional cooking apparatus.

DESCRIPTION OF THE PREFERRED EMBODIMENTS

Figure 1:
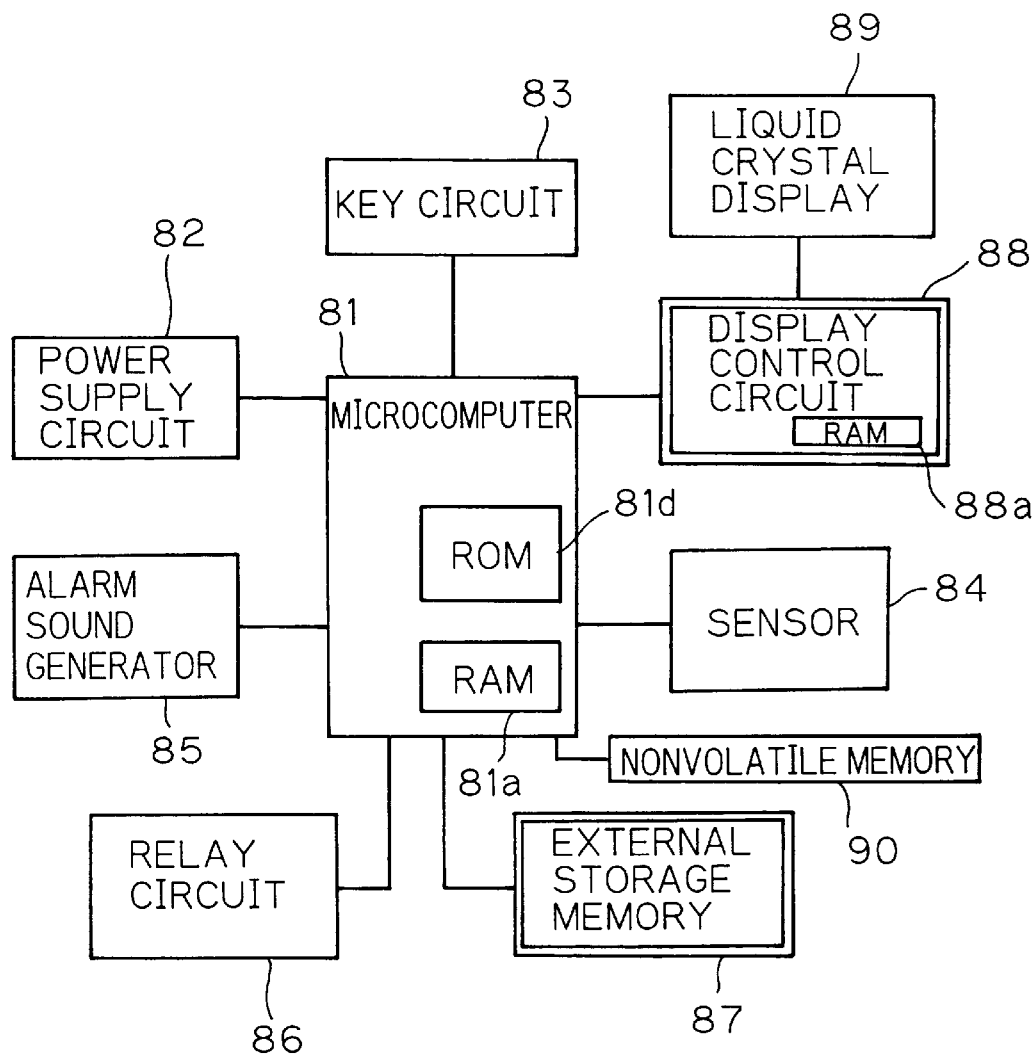
FIG. 1 is a block diagram of the control circuit of the cooking apparatus of a first embodiment of the invention.

Hereinafter, embodiments of the present invention will be described with reference to the accompanying drawings. FIG. 1 is a block diagram showing the control circuit of the cooking apparatus, such as a microwave oven, of a first embodiment of the invention. In FIG. 1, reference numeral 81 represents a microcomputer that has a temporary storage memory (RAM) 81a and that controls various operations, such as cooking, display, and data entry operations, performed in the cooking apparatus.

Connected to the microcomputer 81 are a power supply circuit 82, a key circuit 83 for generating signals corresponding to the operation of the keys arranged on the operation panel 10 (see FIG. 2) described later, a sensor 84 for monitoring the temperature, humidity, and the like in the heating chamber (not shown), an alarm sound generator 85 for generating various alarm sounds in accordance with the operation status of the heater such as a magnetron, a relay circuit 86 for switching the states of the driving circuit of the cooking apparatus, an external storage memory 87 having a large storage capacity, a display control circuit 88 for driving and controlling the liquid crystal display 89 provided on the operation panel 10, and a nonvolatile memory (EEPROM) 90 that allows data to be freely written thereto and erased therefrom.

As the liquid crystal display 89, a full-dot-matrix STN (supertwisted nematic) liquid crystal display panel is used to allow cooking-related messages and guides to be displayed in characters and with illustrations that are large enough to be easily recognizable.

A large amount of data needs to be stored in this embodiment to achieve display of various screens on the liquid crystal display 89, such as item selection screens, cooking-in-progress screens, message screens, and illustration screens. For this reason, the external storage memory 87 is used to store display data, alarm sound data, and cooking data, as well as the programs executed by the microcomputer.

However, in cases where the specifications of the cooking apparatus require only a moderate storage capacity for programs, the programs may be stored in a internal storage memory (ROM) 81d provided within the microcomputer 81. In actual reading of display data, the microcomputer 81 reads the display data of one screen by reading a fraction thereof at a time and repeating such a reading operation several times, storing the read fraction in the temporary storage memory 81a every time.

The microcomputer 81 transfers the display data stored in the temporary storage memory 81a to a display memory 88a provided within the display control circuit 88. The display data stored in the display memory 88a is fed to the liquid crystal display 89 sequentially for one column of pixels after another in the form of a display data signal. By feeding the display data signal for one column of a screen after another at regular intervals, display of one complete screen is achieved. This flow of operations is repeated to keep the screen displayed stably.

Figure 2:
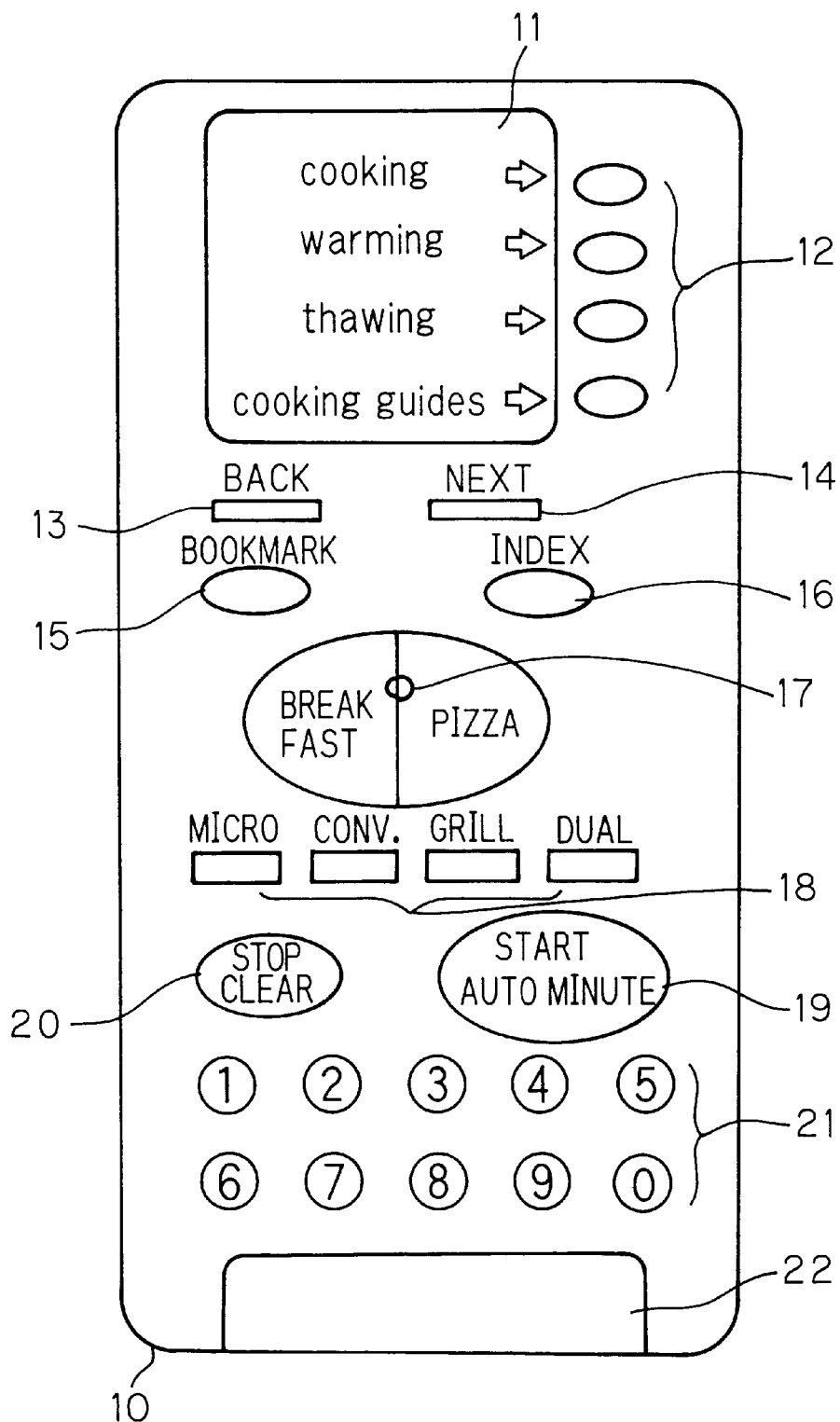
FIG. 2 is a front view of the operation panel of the cooking apparatus of the first embodiment.
Figure 4A:
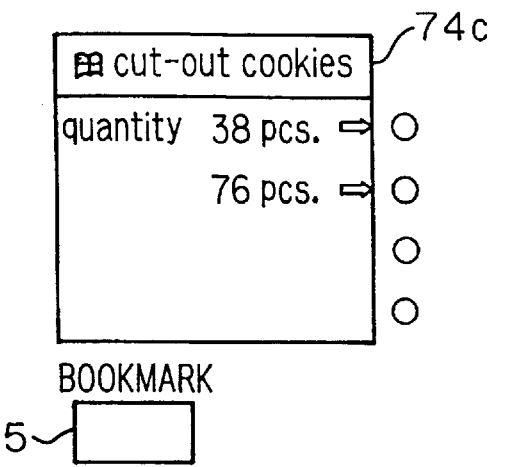
FIGS. 4A–D are diagrams illustrating the change of the screen displayed on the operation panel of the cooking apparatus of the first embodiment when a bookmark is attached to a specific screen.
Figure 4B:
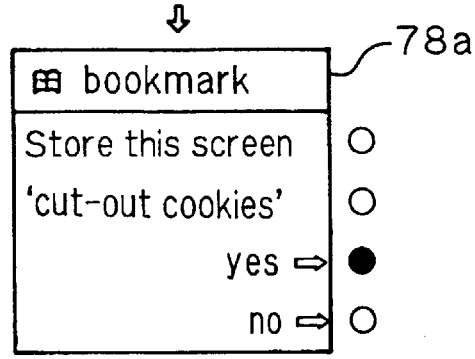
Figure 4C:
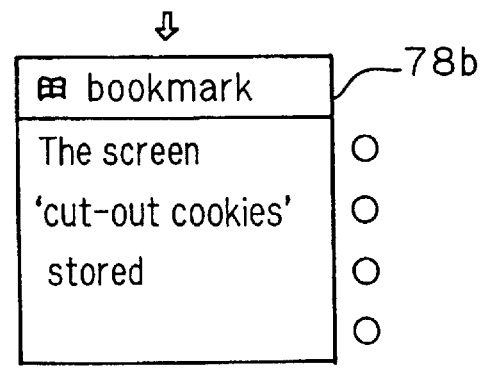
Figure 4D:
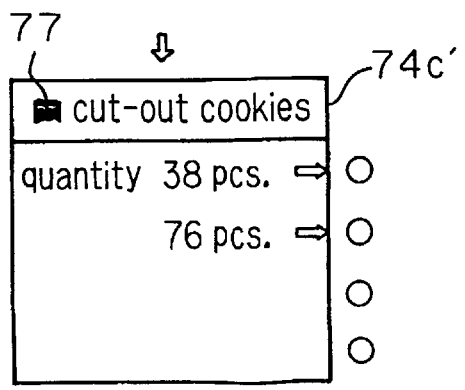

FIG. 2 is a front view of the operation panel 10 of the cooking apparatus of this embodiment. The operation panel 10 has a display panel 11 composed of a liquid crystal display 89 as described above, and has four selection keys 12 arranged by the side of the display panel 11. The selection keys 12 are used to select an item, such as a cooking cycle, on a screen displayed on the display panel 11.

Below the display panel 11 are arranged a back key 13 for feeding backward the screens thus far displayed, a next key 14 for feeding forward the screens thus far fed backward, a bookmark key 15 for attaching a bookmark to the screen currently displayed, and an index key 16 for displaying a list of the names of the groups [A], [B], [C], . . . into which cooking menus are classified by their first letter.

Moreover, in a central portion of the operation panel 10 are arranged automatic cooking menu keys 17 for directly selecting a menu to be cooked, and four manual heating mode selection keys 18 for manually setting the heating mode. In a lower portion of the operation panel 10 are arranged a start key 19 for starting cooking, a cancel key 20 for canceling an already selected item, a heating time entry key 21 for manually entering the heating time and other values, and a door open button 22 for opening the door of the cooking apparatus.

The screens displayed on the display panel 11 to allow selection of a cooking menu have a hierarchical structure. Switching from one screen to another screen lower in level is achieved by pressing one of the selection keys 12. FIG. 3 shows examples of such switching of screens.

In the stand-by state before cooking, on the display panel 11 are displayed the current time and the selection screen 71 of the highest-level grouping of menus shown under (a). In the selection screen 71 of the highest-level grouping of menus, the following four items are displayed as alternatives for selection: [cooking] for selecting a listing of automatic menus, [warming] for selecting a listing of various modes of automatic warming by microwaves, [thawing] for selecting a listing of various modes of automatic thawing of frozen food, and [cooking guides] for selecting a listing of cooking-related messages and pieces of advice.

When [cooking] is selected on the selection screen 71 of the highest-level grouping of menus, the screen is switched to the selection screen 72, belonging to a one step lower level shown under (b), of a listing of groups of cooking menus for automatic cooking. In the selection screen 72 of a listing of groups of cooking menus, it is possible to switch from one page 72 of the screen to another 73 by pressing the next key 14 (see FIG. 2). When [cookies] is selected on the selection screen 72 of a listing of groups of cooking menus, the screen is switched to a screen, belonging to a one step lower level shown under (c), that has an indication symbol 77 and the title of the screen displayed in the upper portion thereof and that has the selection screen 74a of [cookies 1], having a listing of types of cookies, displayed in the lower portion thereof. This screen can be switched to the selection screen 74b of [cookies 2] by pressing the next key 14.

When [cut-out cookies] is selected on the selection screen 74a of [cookies 1], the screen is switched to the selection screen 74c, belonging to one step lower level shown under (d), of [cut-out cookies]. When [quantity 38 pcs.] is selected, the screen is switched to the selection screen 74d, belonging to one step lower level shown under (e), for choosing whether to perform [baking] or to refer to the [recipe]. When [baking] is selected, the screen is switched to the selection screen 74e, belonging to one step lower level shown under (f), for selecting how the cookies are to be baked from among [brown], [standard], and [light]. When one of these choices is selected and then the start key 19 (see FIG. 2) is pressed, heating is started. In the example shown in the figure, [standard] is selected.

When [recipe] is selected on the selection screen 74d, the screen is switched to the selection screen 74f, belonging to the level (f), of a listing related to the recipe. For [cut-out cookies], the listing includes items [ingredients], [preparing dough], [forming], and [baking]. When one of these items is selected, the corresponding piece of recipe-related information is displayed on the screen.

When [cake] is selected on the selection screen 72 of the listing of groups of cooking menus, the screen is switched to the selection screen 75a, belonging to the level (c), of [cake 1]. This screen can be switched to the selection screen 75b of [cake 2] by pressing the next key 14. When [sponge cake] is selected on the selection screen 75a of [cake 1], the screen is switched to the selection screen 75c, belonging to the level (d), for choosing between [1-floor baking] and [2-floor baking].

When [1-floor baking] is selected, the screen is switched to the selection screen 75d, belonging to the level (e), for choosing between [baking] and [recipe]. When [baking] is selected, the screen is switched to the selection screen 75e, belonging to the level (f), for selecting how the cake is to be baked from among [brown], [standard], and [light]. When one of these choices is selected and then the start key 19 (see FIG. 2) is pressed, heating is started. In the example shown in the figure, [standard] is selected. When [recipe] is selected on the selection screen 75d, the screen is switched to the selection screen 75f, belonging to the level (f), of a listing related to the recipe.

When [hints on cooking] is selected on the selection screen 73 of the listing of groups of cooking menus, the screen is switched to the screen 76a, belonging to the level (c), of [hints on cooking] in which a listing is displayed including items [handy a-la-carte dishes], [dishes from all over the world], [dishes for children], and [notes on cooking]. When [notes on cooking] is selected on this screen, the screen is switched to the selection screen 76b, belonging to the level (d), of [notes on cooking]. When [tips on frying] is selected from the listing displayed on this screen, the screen is switched to the selection screen 76c, belonging to the level (e), of a listing related to [tips on frying]. When [basics of tempura] is selected on this screen, the screen is switched to the selection screen 76d, belonging to the level (f), for selecting among items [ingredients of batter], [preparing batter], and [how to fry]. When one of these items is selected, the corresponding piece of tempurarelated information is displayed on the screen.

The screens that have an indication symbol 77 displayed in the upper portion thereof, as those belonging to the levels (c), (d), . . . , have their respective sets of display data previously stored in the external storage memory 87 (see FIG. 1), with a screen code attached to each set of display data. By pressing the bookmark key 15 (see FIG. 2) (serving as a bookmark attachment requesting member) when a screen with an indication symbol 77 is displayed, it is possible to attach a bookmark to that screen. This is achieved by storing the corresponding screen code in the nonvolatile memory 90 (see FIG. 1). Note that, in the present specification, a screen to which a bookmark is attached is referred to also as a "bookmarked" screen.

FIG. 4 shows an example of how a bookmark is attached to a screen. First, when the bookmark key 15 is pressed while the selection screen 74c of [cut-out cookies] as shown at (a) is displayed, the screen is switched to the screen 78a as shown at (b). In response to the question "Store this screen 'cut-out cookies'?" displayed here, if [yes] is selected, the screen code of the set of display data for the screen [cut-out cookies] is stored in the nonvolatile memory 90.

Then, the screen is switched to the screen 78b as shown at (c), where the message "The screen 'cut-out cookies' stored" is displayed for a predetermined length of time. Thereafter, the screen is switched to the screen 74c' of [cut-out cookies] as shown at (d). In this screen, the indication symbol 77 is displayed in reverse video so that it will be easily recognizable that a bookmark is attached to this screen 74c'.

Figure 5A:
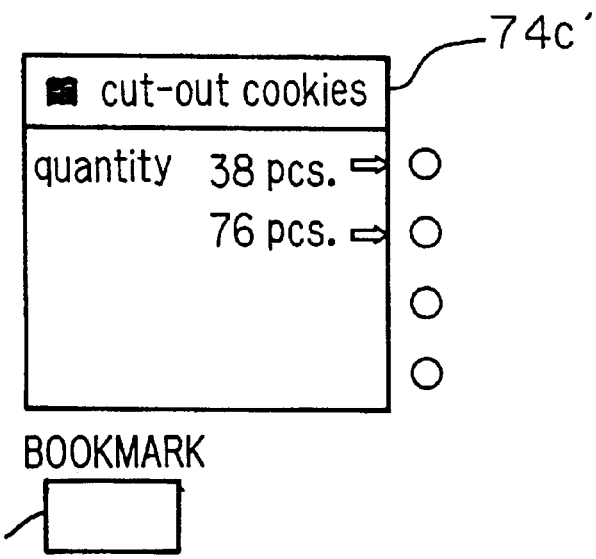
FIGS. 5A–B, hereinafter referred to as FIG. 5, are diagrams illustrating the flow of operations performed in the cooking apparatus of the first embodiment when a bookmark is attached to a specific screen.
Figure 5B:
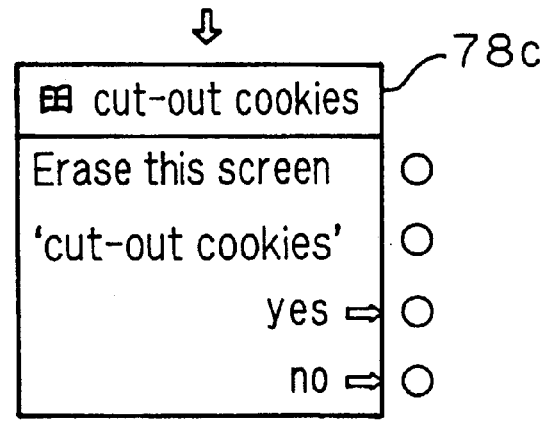
Figure 6:
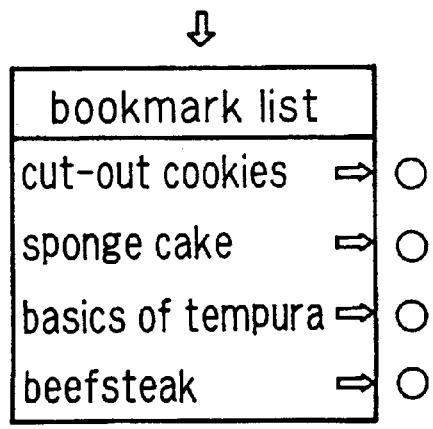
FIG. 6 is a diagram illustrating the flow of operations performed in the cooking apparatus of the first embodiment when a bookmark is deleted from a specific screen.

FIG. 5 shows an example of how a bookmark is erased from a screen. First, when the bookmark key 15 is held pressed for three seconds while the screen 74c' of [cut-out cookies] as shown at (a) is displayed, the screen is switched to the screen 78c as shown at (b). Note that, to save space on the operation panel 10, the same bookmark key 15 is used here as is used to attach the bookmark. In response to the question "Erase this screen 'cut-out cookies'?" displayed here, if [yes] is selected, the screen code of the set of display data for the screen [cut-out cookies], which has thus far been stored in the nonvolatile memory 90, is erased therefrom. Then, the screen is switched back to the screen 74c as shown at (a) in FIG. 4, with the indication symbol 77, which has thus far been displayed in reverse video, now displayed in normal video.

By pressing the bookmark key 15 (serving as a bookmarked screen display requesting member) when the initial screen, belonging to the level (a) shown in Fig. 3, that is displayed in the stand-by state, or one of the screens, belonging to the level (b), that do not have an indication symbol 77 is displayed, it is possible to jump to and display a bookmarked screen. When there are more than one bookmarked screen, a listing is displayed on which the titles of the screens thus far bookmarked are listed in chronological order (with the most recently bookmarked one displayed at the top). By selecting the title of the desired screen on this listing, it is possible to jump to and display that screen.

In this way, by attaching a bookmark to a screen that is frequently referred to, it is possible to jump to and display the screen quickly whenever necessary. This makes it possible to execute a specific automatic cooking menu quickly or refer to a specific piece of cooking-related information quickly, and thereby enhances user-friendliness.

To display an entire screen or a list of titles of screens in accordance with the screen codes stored in the nonvolatile memory 90, first, for each screen, the display data is divided into the data of the title portion and the data of the remaining portion. Then, the display data is stored in the nonvolatile memory 90 with one screen code for the title portion and with another screen code having a different last digit for the remaining portion. This makes it easier to retrieve a screen code when a specific screen is displayed, and to distinguish a case where an entire screen is displayed from a case where a list of the titles of screens is displayed.

To achieve display of the indication symbol 77, two sets of data, one in normal video and the other in reverse video, are previously stored in the internal storage memory 81d or in the external storage memory 87. When a screen is displayed, the display program first checks whether the screen is bookmarked or not, and then reads the appropriate one of the two sets of data to display it on the screen. This helps simplify the program.

Figure 7:
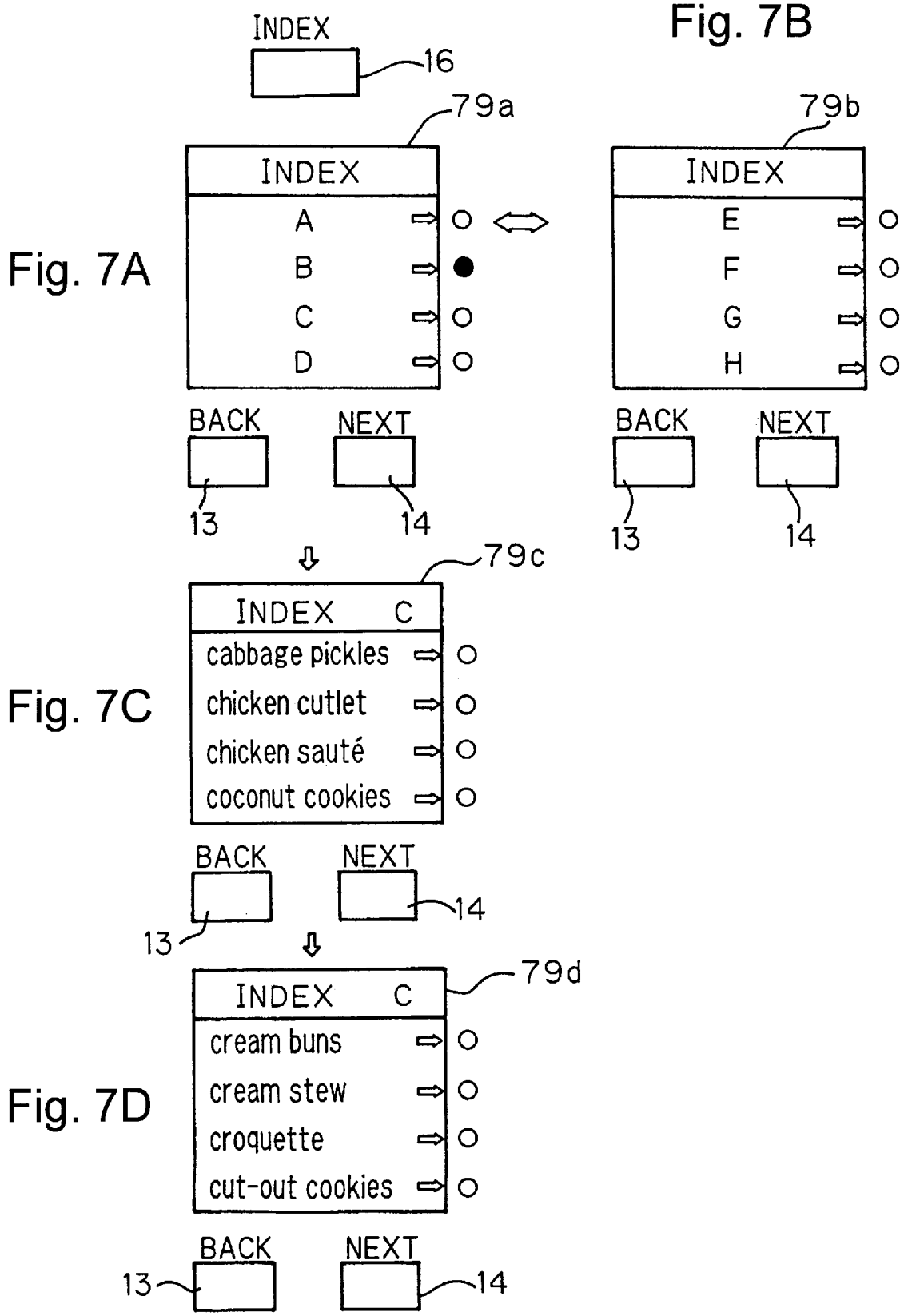
FIGS. 7A–D, hereinafter referred to as FIG. 7, are diagrams illustrating the operation flow of the cooking apparatus of the first embodiment when index screens are used.

Next, how selection of a cooking menu is achieved by the use of the index key 16 shown in FIG. 2 will be described. When the index key 16 is pressed, the screen 79a, as shown at (a) in FIG. 7, of a listing of the names [A], [B], [C], . . . of the groups into which cooking menus are classified by their first letter is displayed. Cooking menus do not necessarily have to be classified into groups arranged in alphabetical order, but may be classified into groups arranged in any order according to the writing system of any language. At first, the first page of the listing, on which the groups [A], [B], [C], and [D] are listed, is displayed. By pressing the next key 14, the next page 79b of the listing as shown at (b) is displayed, and by pressing the back key 13 then, the first page 79a of the listing is displayed again.

When [C] is selected by pressing the corresponding one of the selection keys 12, the selection screen 79c as shown at (c) is displayed on which the first page, including the items [cabbage pickles], [chicken cutlet], [chicken sauté], and [coconut cookies], of a listing of cooking menus starting with the letter C arranged in alphabetical order is shown. By pressing the next key 14, the next page of the listing as shown at (d), including the items [cream buns], [cream stew], [croquette], and [cut-out cookies], is displayed.

When the desired cooking menu is selected, the screen is switched to the screen of that cooking menu. For example, when [cut-out cookies] is selected, the selection screen 74c of [cut-out cookies] as shown in FIG. 3 is displayed, and thereafter it is possible to continue operation in the same way as described earlier.

In this way, it is possible to search for a specific cooking menu in predetermined, for example alphabetical, order, and thereby reach the desired cooking menu quickly and easily.

Figure 8:
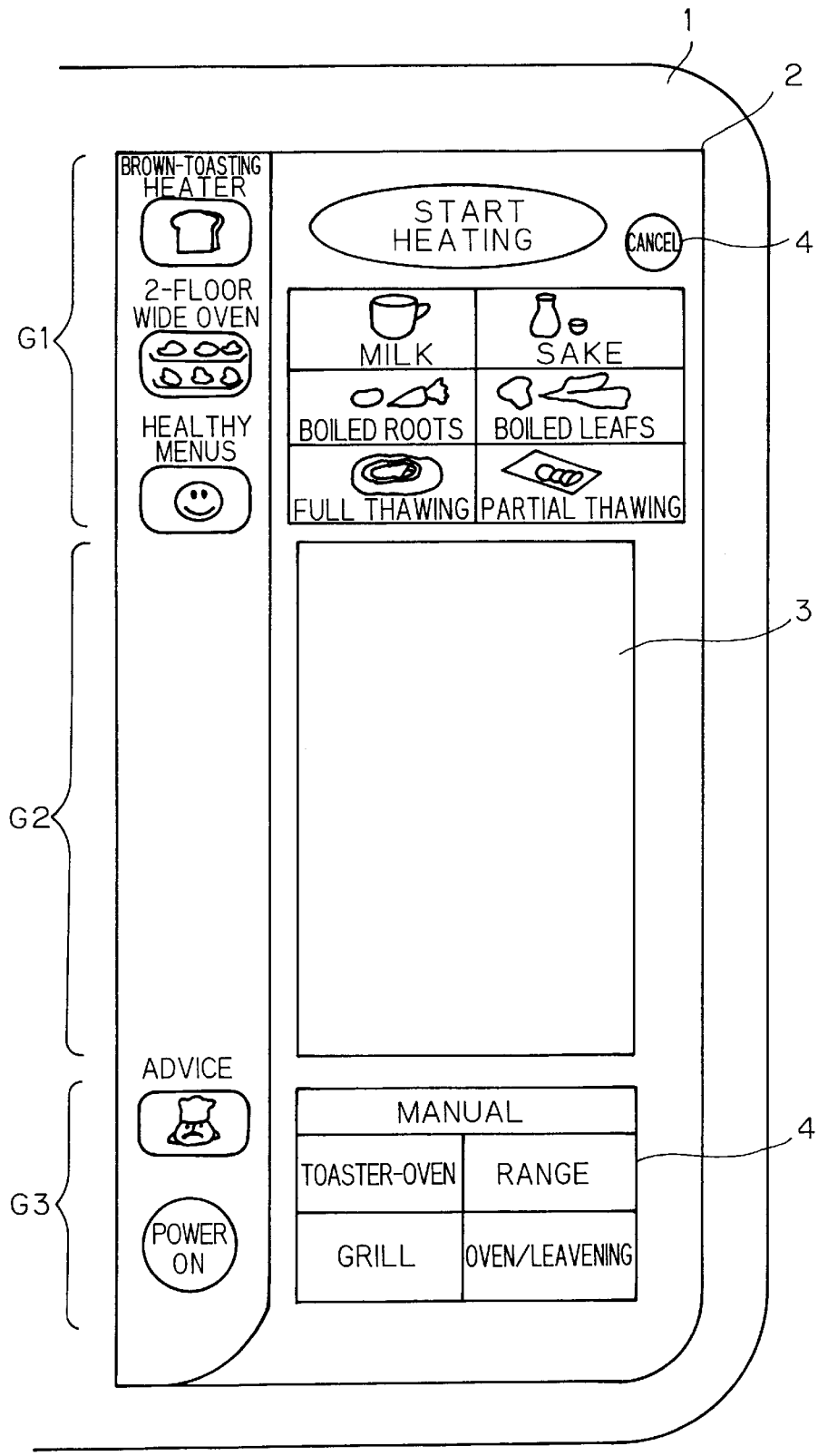
FIG. 8 is a front view of the operation panel of the cooking apparatus of a second embodiment of the invention.
Figure 9:
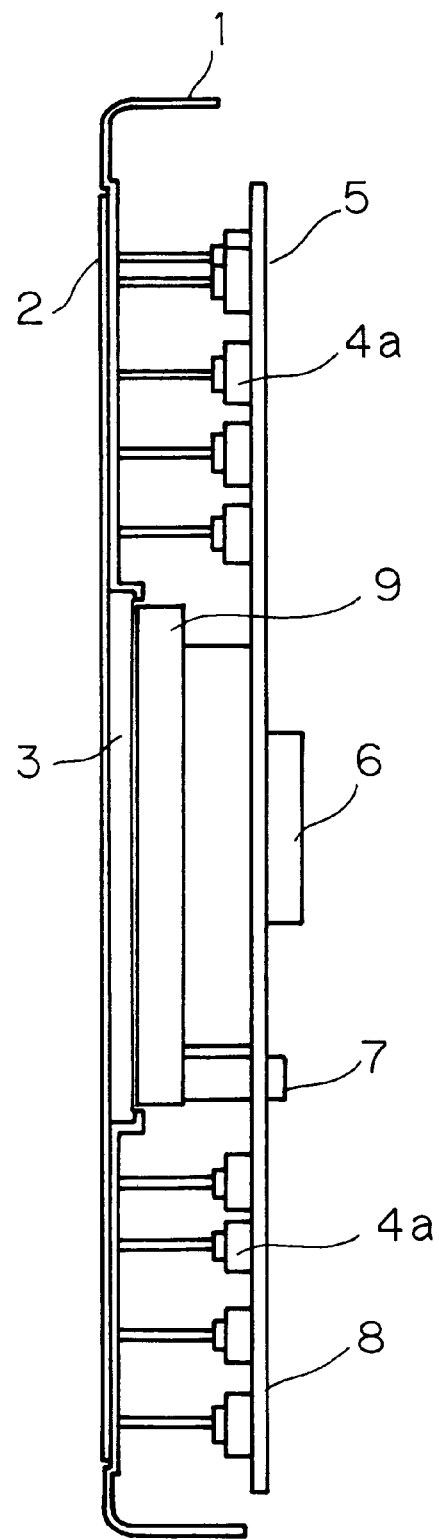
FIG. 9 is a sectional side view of the operation panel of the cooking apparatus of the second embodiment.

FIGS. 8 and 9 are a front view and a sectional side view of the operation panel of the cooking apparatus of a second embodiment of the invention. As shown in FIG. 8, the operation panel 1 is divided into an upper portion G1, a middle portion G2, and a lower portion G3, and the upper and lower portions G1 and G3 are provided with individually operated entry keys 4 formed on a print sheet 2 by printing. These entry keys 4 are assigned frequently used functions, and, to make their functions easily recognizable, they are marked with, for example, characters or a symbol representing a type of food or a piece of tableware.

The print sheet 2 has, in its middle portion G2, a touch panel 3. The touch panel 3 has, on its back surface, a display panel 9 (see FIG. 9) such as a liquid crystal display or fluorescent display tube for displaying the current time and a plurality of alternatives as to the heating mode and heating pattern to allow heating to be performed in a manner fit for the material or menu to be cooked.

As shown in FIG. 9, behind the print sheet 2 is placed a printed circuit board 5, on which a microcomputer 6, a key cable 7, and a control circuit 8 are provided. The key cable 7 connects the touch panel 3 to the circuitry formed on the printed circuit board 5 to achieve control of input/output operations of the touch panel 3.

Figure 10:
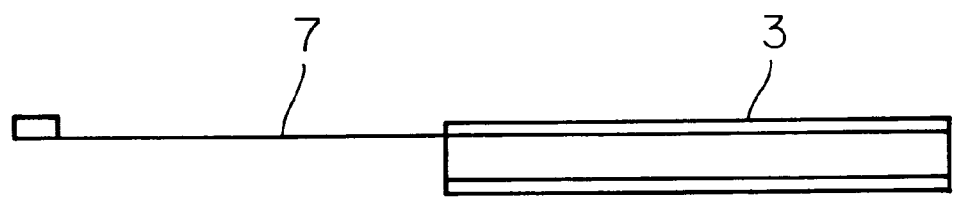
FIG. 10 is a side view of the touch panel of the cooking apparatus of the second embodiment.
Figure 11:
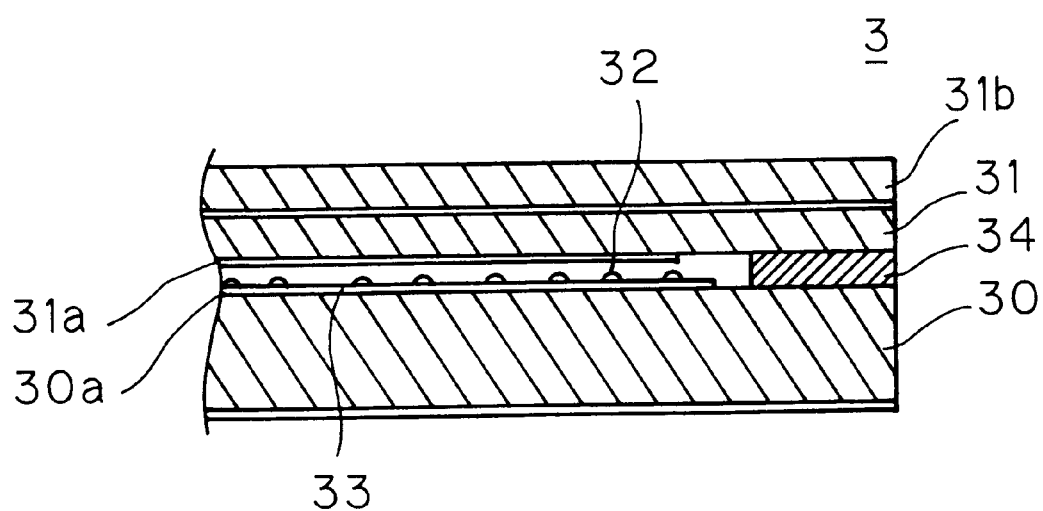
FIG. 11 is a side view of the principal portion of the touch panel of the cooking apparatus of the second embodiment.

FIGS. 10 and 11 show the structure of the touch panel 3, with FIG. 10 showing a side view thereof and FIG. 11 showing a sectional side view of the principal portion thereof. A flexible PET (polyethylene terephthalate) film 31 is laid on a glass substrate (transparent substrate) 30. The PET film 31 is bonded to the glass substrate 30 with double-sided adhesive tape 34 applied along their edges, with an air layer 33 secured between them.

On the surface of the PET film 31 that faces the air layer 33, a transparent conductive pattern 31a (a second transparent electrode) made of ITO (indium tin oxide) is formed. Similarly, also on the surface of the glass substrate 30 that faces the air layer 33, a transparent conductive pattern 30a (a first transparent electrode) made of ITO is formed.

On the conductive pattern 30a, hemispheric spacers 32 are formed to keep uniform the thickness of the space secured between the conductive patterns 31a and 30a (this space will hereafter be referred to as the "membrane gap").

The thickness of the space secured as the membrane gap is so adjusted by the spacers 32 that the touch panel 3 can be operated with a comparatively weak pressing force. By contrast, the entry keys 4 (see FIG. 8) formed in the upper and lower portions G1 and G3 of the print sheet 2 have tact switches 4a (see FIG. 9) or the like arranged on their back surface so that they are operated with a comparatively strong pressing force. This helps change the operation feel according to what is going to be entered, and thereby enhance the user-friendliness. Instead of the tact switches 4a, it is possible to use membrane keys composed of printed spacer sheets. Moreover, the tact switches 4a do not necessarily have to be mounted on the printed circuit board 5.

Figures 12A, 12B:
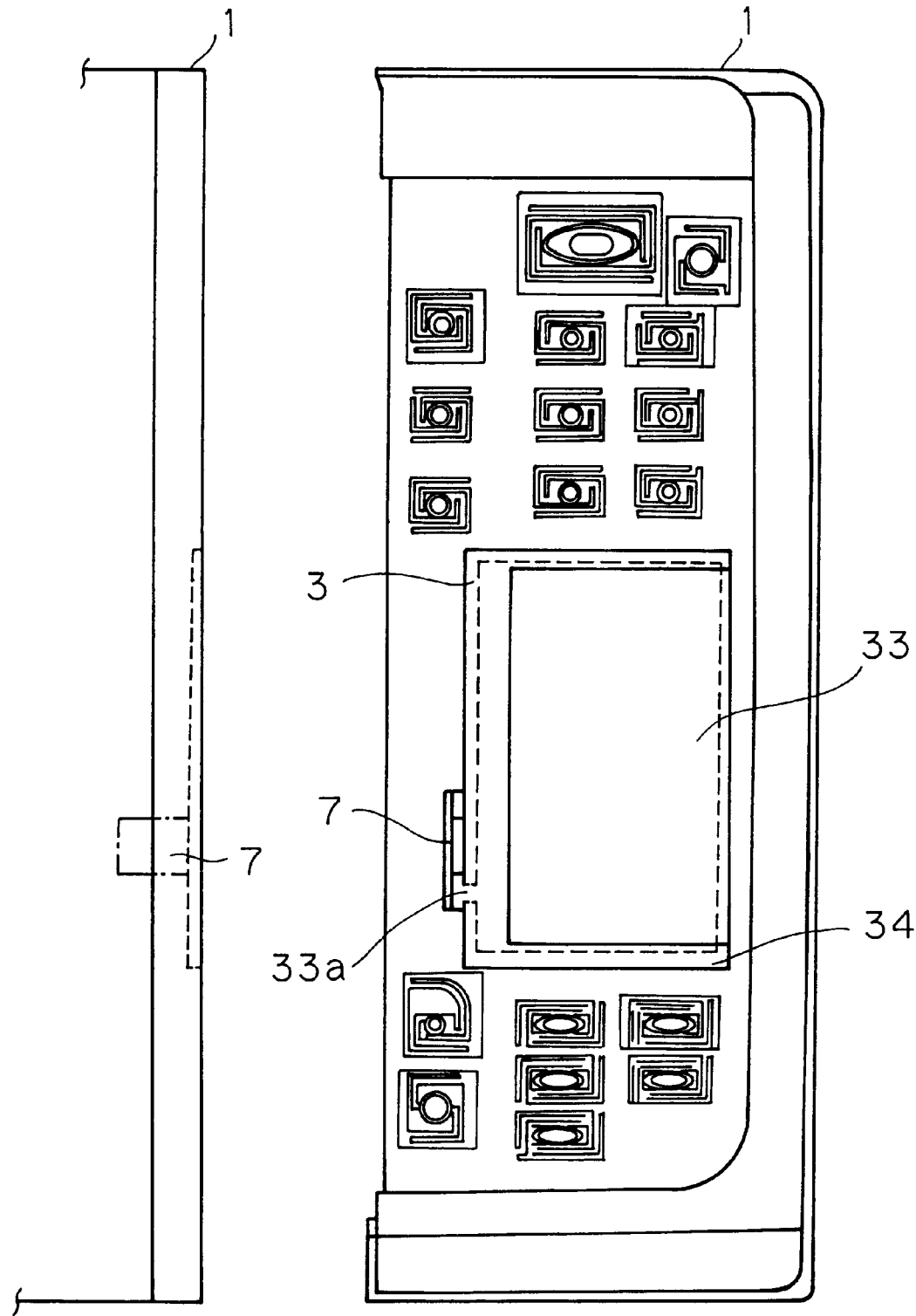
FIGS. 12A and 12B are diagrams illustrating how the operation panel is fitted in the second embodiment.
Figure 13:
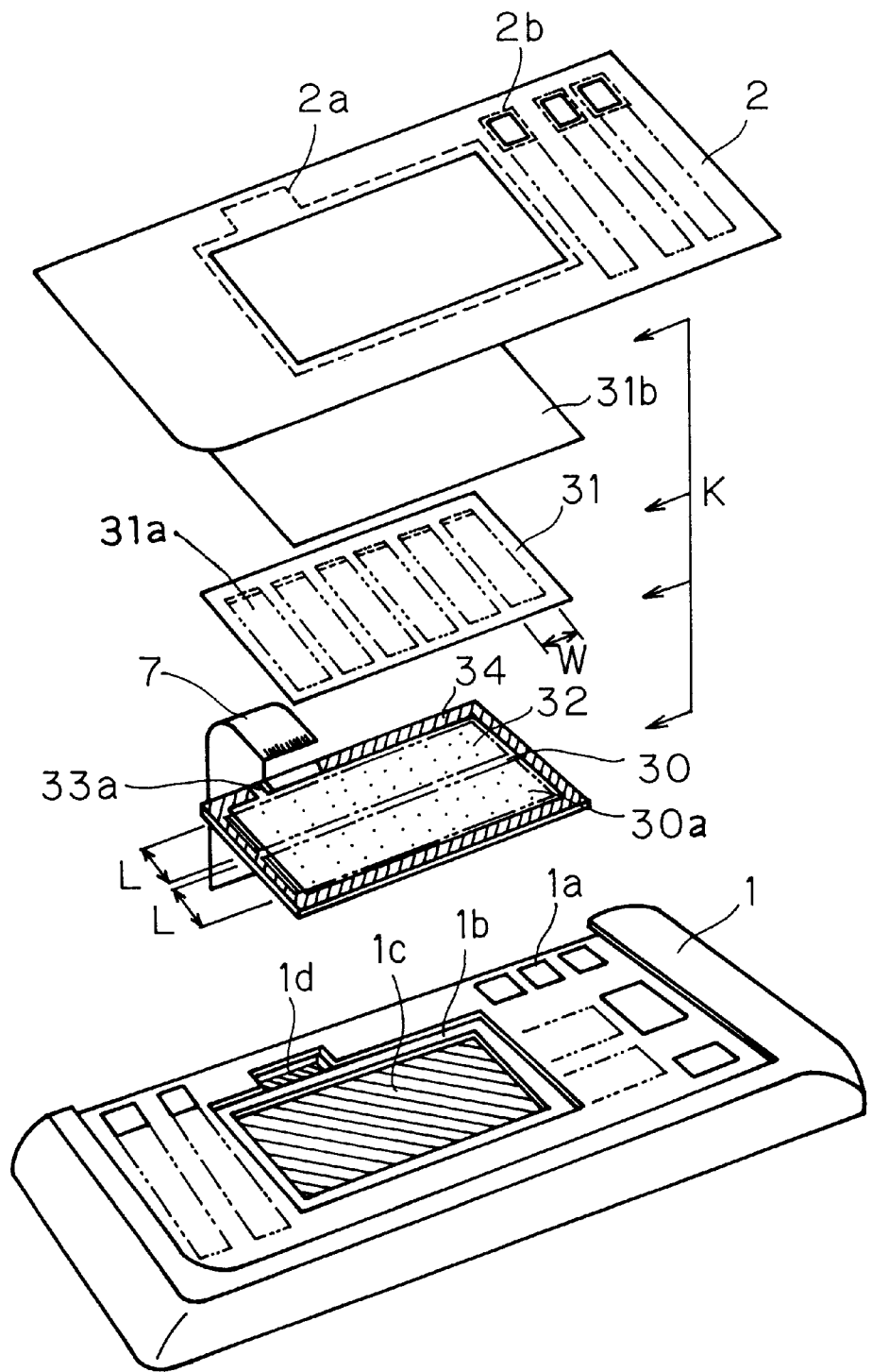
FIG. 13 is an exploded perspective view of the operation panel of the cooking apparatus of the second embodiment.

FIGS. 12A and 12B show how the operation panel 1 and the touch panel 3 are fitted, with FIG. 12A showing a side view thereof and FIG. 12B showing a front view thereof. FIG. 13 is an exploded perspective view showing how the touch panel 3 is fitted to the operation panel 1. Here, it is to be assumed that the touch panel 3 has already been assembled in the preceding process from a plurality of touch panel components K including the glass substrate 30. A plurality of strip-shaped conductive patterns 30a each having a width L are formed on the glass substrate 30 by printing, and, perpendicularly thereto, a plurality of strip-shaped conductive patterns 31a having a width W are formed on the PET film 31 by printing. The PET film 31 has a reinforcement film 31b laid over its top surface.

The air layer 33 secured inside the touch panel 3, if closed up hermetically, may cause a key to be unnecessarily brought into an on state when the air inside expands as a result of a change in the ambient temperature. Moreover, a change in the atmospheric pressure may cause a change in the pressing force that is required to operate the keys. To prevent these problems, a part of the double-sided adhesive tape 34 that is used to fix the PET film 31 to the glass substrate 33 together is cut away so as to form an air passage 33a. By forming the air passage 33a just below the key cable 7, when the PET film 31 is fitted to the glass substrate 30 and the key cable 7 is connected, it is possible to check easily whether the air passage 33a is formed properly or not.

The touch panel 3 is fitted, with an adhesive or the like, into a recess 1b that is so formed as to be deeper than the pressing surface 1a of the entry keys by the thickness of the touch panel 3. This recess 1b permits the touch panel 3 to be fixed accurately in position. Moreover, through an opening 1c formed in the recess 1b, the display panel 9 such as a liquid crystal display or fluorescent display tube and the touch panel 3 are held together.

Through an opening 1d formed in the recess 1b, the key cable 7 is placed to achieve connection to a control circuit 8 (see FIG. 9). Through this opening 1d, the air passage 33a communicates with the space behind the operation panel 1 so that air can flow freely into and out of the air layer 33. This helps keep uniform the pressing force required to operate the touch panel 3. Moreover, an adhesive is applied to the back surface of the print sheet 2 except within the areas 2a and 2b enclosed by broken lines so that the print sheet 2 can be fitted over the operation panel 1.

FIGS. 14A to 14H show an example of how one screen after another is displayed as the touch panel 3 is operated. When the "OVEN/LEAVENING" key, which is one of the individually operated entry keys 4, is pressed, alternatives of the heating mode are displayed on the touch panel 3. The touch panel 3 has its surface divided into an active area and an inactive area, and when an operation is performed within a boundary FIG. 43 provided within the active area, the screen is switched to the next one.

Figure 14A:
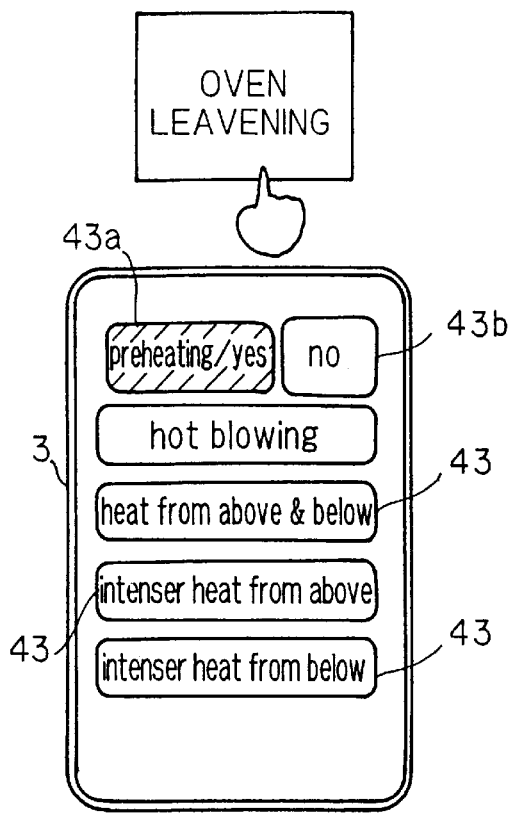
FIGS. 14A to 14H are diagrams illustrating the change of the state of the touch panel of the cooking apparatus of the second embodiment.

First, in FIG. 14A, the active area is so assigned as to include two boundary figures, one for requesting preheating (the "preheating yes" key 43a) and the other for rejecting preheating (the "no" key 43b), so as to allow choice between two alternatives. For example, when the "preheating yes" key is selected, the screen is switched to the screen shown in FIG. 14B.

Figure 14B:
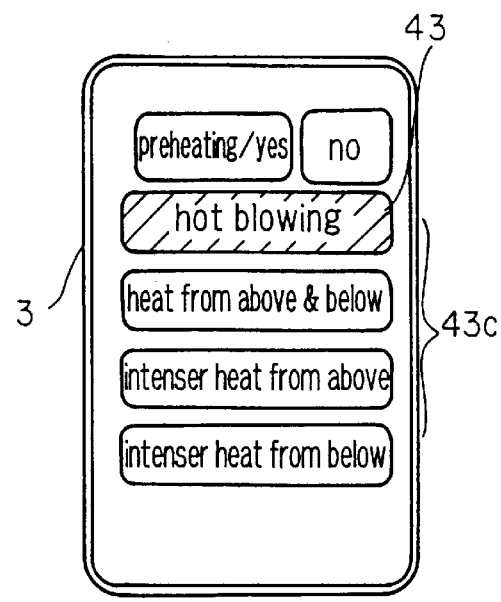

In FIG. 14B, a heating mode is selected from among heating by hot air circulation, heating with the heaters provided at the top and at the bottom of the heating chamber, and heating by microwaves. Here, the active area is so assigned as to include the following four boundary FIGS. 43c to allow selection from four alternatives: "hot blowing" for heating by hot air circulation, "heat from above & below" for heating with the heaters from both above and below, "intenser heat from above" for heating with intenser heat from above, and "intenser heat from below" for heating with intenser heat from below. For example, when the "hot blowing" key is selected, the screen is switched to the screen shown in FIG. 14C.

Figure 14C:
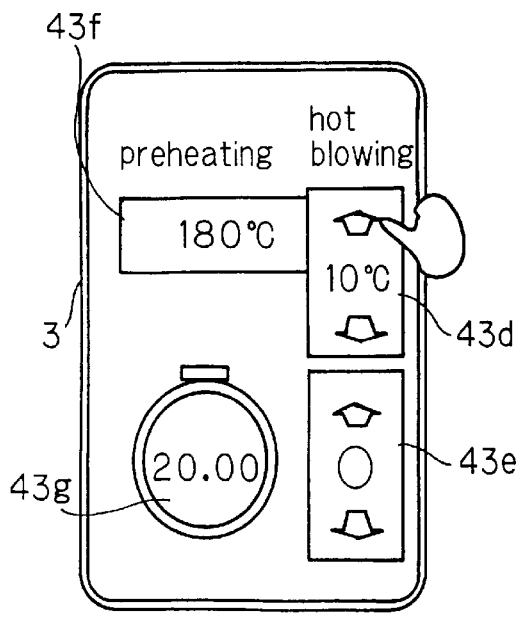
Figure 14D:
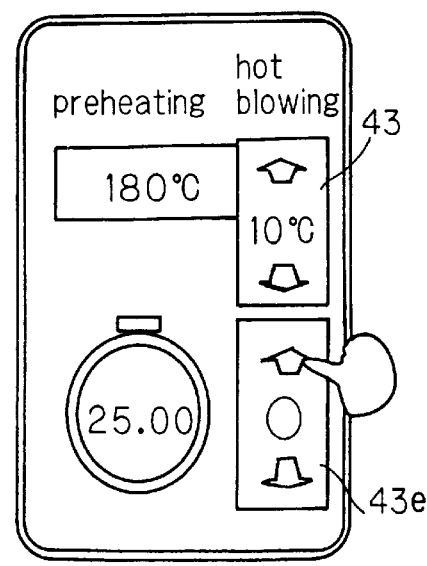

In FIG. 14C, heating conditions are set. On the touch panel 3, the initial value (180° C.) for the heating temperature is displayed in a temperature display area 43f, and the initial value (20 minutes) for the heating time is displayed in a heating time display area 43g. By the side of these display areas, heating temperature adjustment keys 43d and heating time adjustment keys 43e are displayed, to which the active area is assigned.

By pressing either the up or down arrow marked on the heating temperature adjustment key 43d, it is possible to increase or decrease the heating temperature in 10° C. increments or decrements. By pressing either the up or down arrow marked on the heating time adjustment key 43e, it is possible to increase or decrease the preheating time. For example, when the heating time is changed, the screen is switched to the screen shown in FIG. 14D. Note that the conditions (preheating and hot air circulation) already set in FIGS. 14A and 14B are indicated in the upper portion of the screen.

Figure 14E:
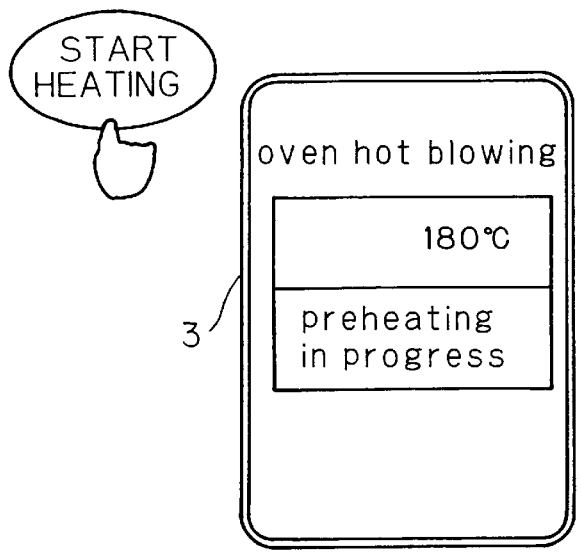

Now that all the heating conditions are set, when the "START HEATING" key on the print sheet 2 is pressed for preheating with no food put in the heating chamber, preheating is started. At this time, on the touch panel 3, indications are displayed which indicate that "preheating" is "in progress" in the "oven hot blowing" mode with the preheating temperature set for "180° C." as shown in FIG. 14E.

Figure 14F:
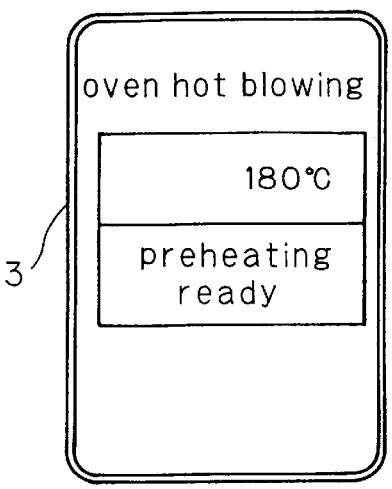
Figure 14G:
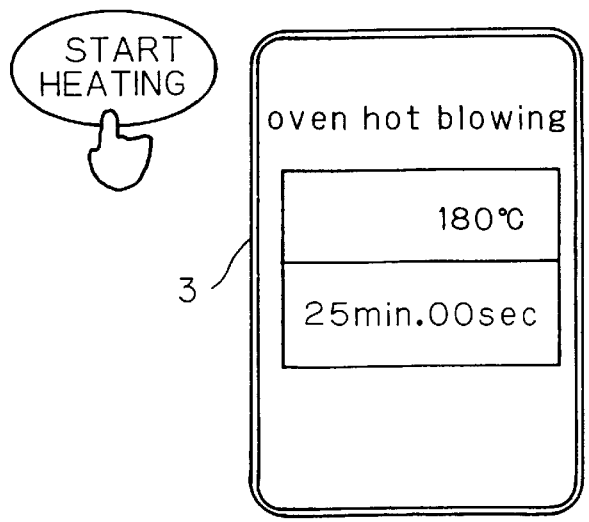

When preheating is completed, the message "preheating ready" is displayed on the touch panel 3 as shown in FIG. 14F. For a predetermined period of time (for example 30 minutes) after the completion of preheating, the heating chamber is kept preheated. When, within this period, the "START HEATING" key is pressed with food put in the heating chamber, cooking is started. At this time, on the touch panel 3, indications are displayed which indicate that cooking is in progress in the "oven hot blowing" mode with the heating temperature set for "180°C." and the heating time set for "25 min. (minutes) 00 sec. (seconds)" as shown in FIG. 14G.

Figure 14H:
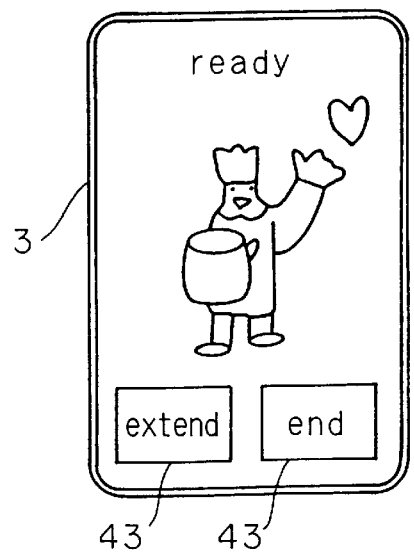

When cooking is completed, the message "ready" is displayed on the touch panel 3 as shown in FIG. 14H. Simultaneously, an "extend" key for requesting extension of the cooking time and an "end" key for ending cooking are also displayed. When the "end" key is pressed, the screen on the touch panel 3 is switched back to its initial state.

Figure 15:
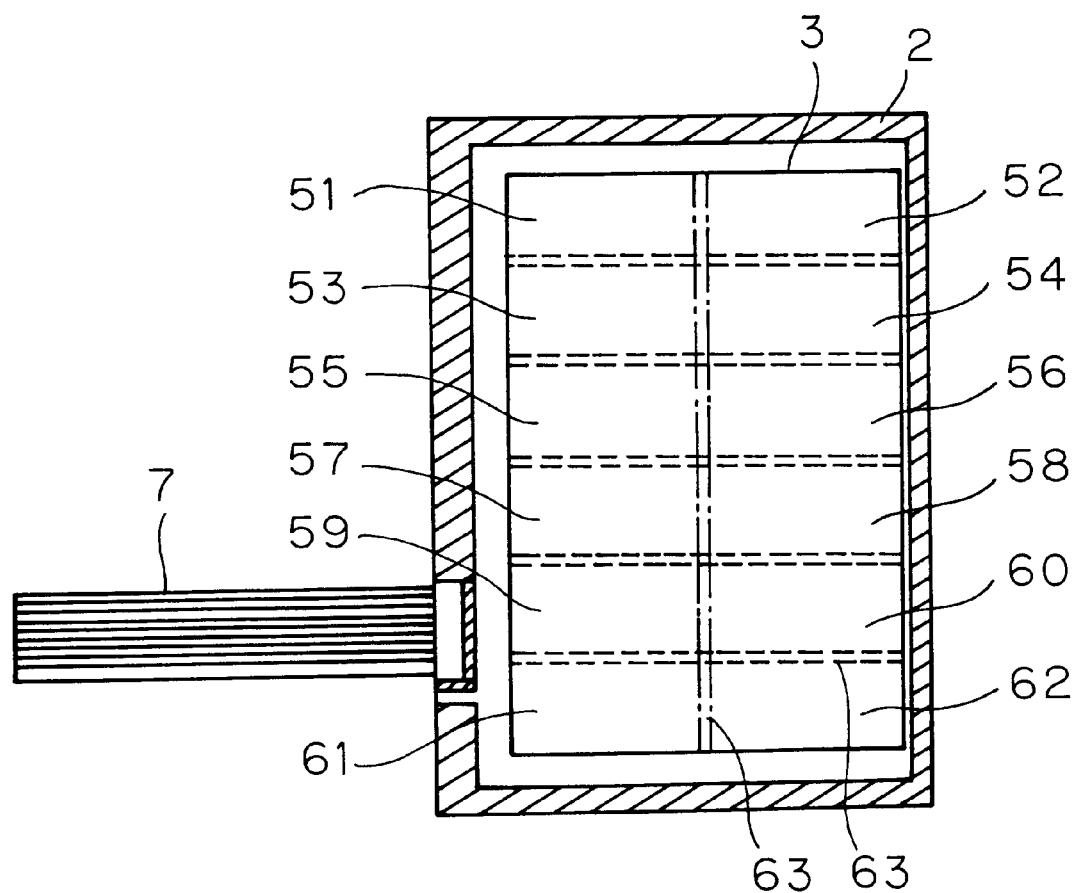
FIG. 15 is a diagram illustrating an example of how active and inactive areas are assigned on the touch panel of the cooking apparatus of the second embodiment.

FIG. 15 shows the positional relationship between the active and inactive areas on the touch panel 3. The active area on the touch panel 3 is divided into regions 51 to 62 with the inactive area filling the gap between two adjacent regions so as to prevent simultaneous selection of more than one region. A boundary FIG. 43 is so provided as to cover one or more of these regions, and the regions other than those assigned to a boundary FIG. 43 are treated as belonging to the inactive area by ignoring an operation made therein. This permits input operations to be performed without errors.

In this way, the character-based data items, symbols, and illustrations displayed on the display panel 9 can be operated interactively by directly operating the touch panel 3. This helps enhance the user-friendliness of the stored automatic cooking programs. Moreover, the active and inactive areas can be assigned differently on different screens, and a boundary FIG. 43 can be freely assigned to cover a part of the active area. This helps make clear where an input operation is accepted on the touch panel 3, and thereby prevent omission and errors in input operations. Here, it is preferable to assign a boundary FIG. 43 in such a way as to have a smaller area than the active area. This helps permit the boundary FIG. 43 to be operated by the user not only when the user is standing right in front of the cooking apparatus but also when the user is operating from an oblique direction.

Figure 16:
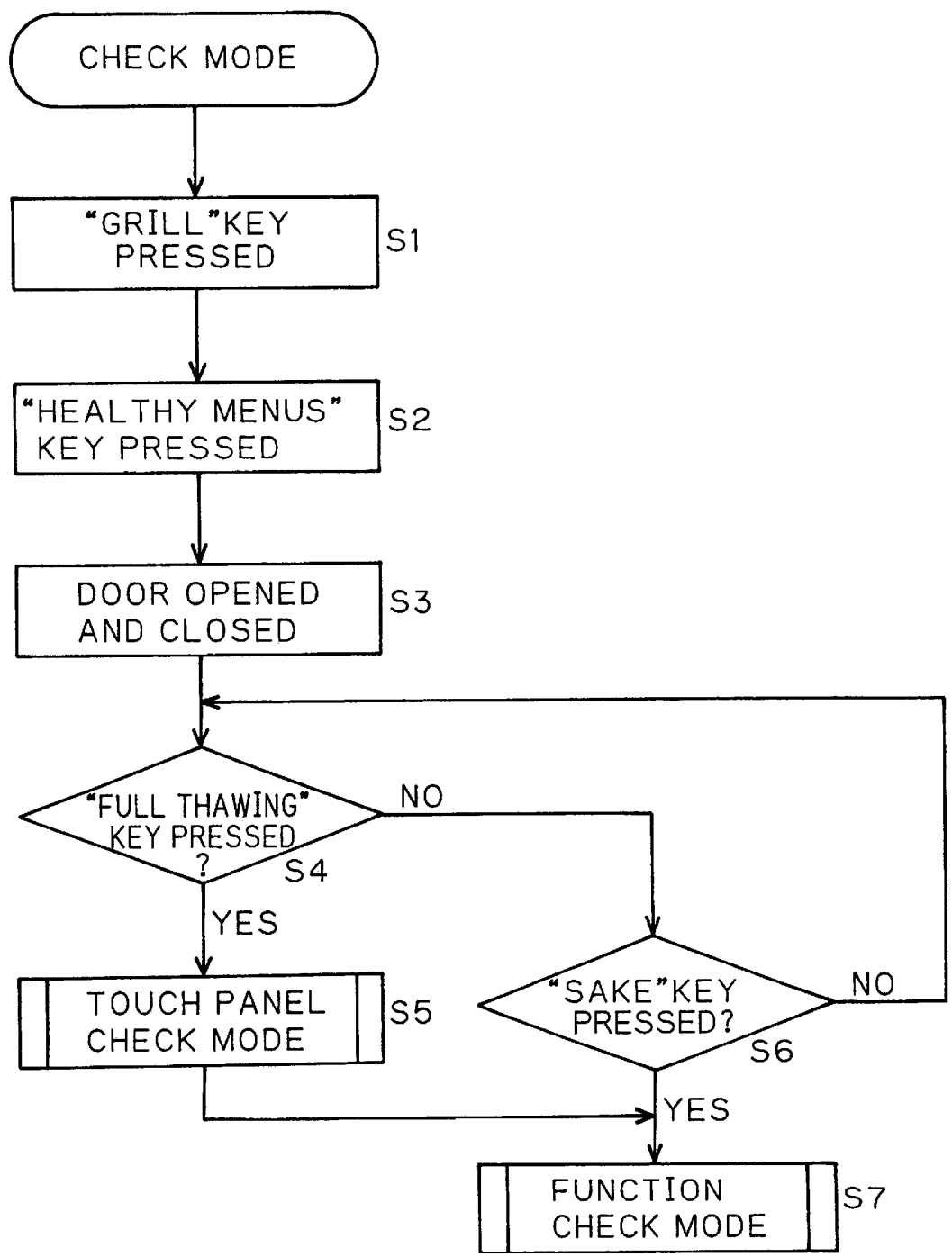
FIG. 16 is a flow chart showing the flow of operations performed during checking in the cooking apparatus of the second embodiment.

FIG. 16 is a flow chart showing an example of the flow of operations performed to check the operation of the operation panel 1 in the manufacturing process. In steps S1, S2, S3, and S4, when the "GRILL" and "HEALTHY MENUS" keys (see FIG. 8) on the print sheet 2 are pressed, and then the door of the heating chamber is opened and then closed, and then the "FULL THAWING" key is pressed, the microcomputer 6, through the printed circuit board 5, recognizes this flow of operations and starts a mode for checking the touch panel 3 (steps S4 and S5).

Figure 17:
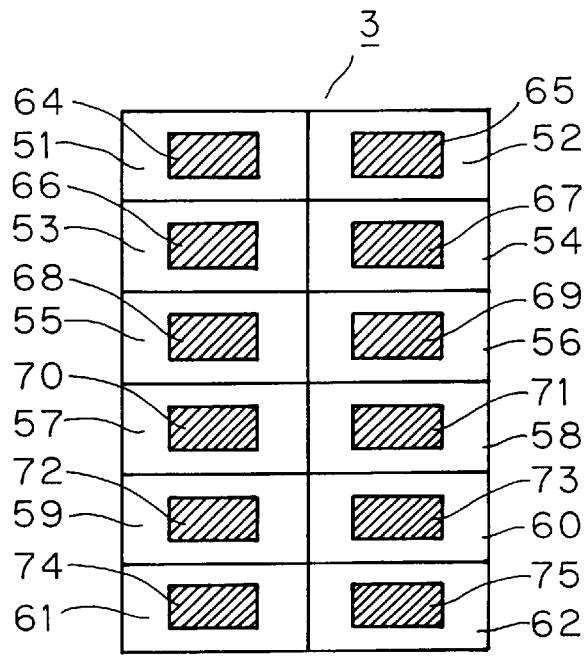
FIG. 17 is a diagram showing the state of the touch panel of the cooking apparatus of the second embodiment during checking.
Figure 18:
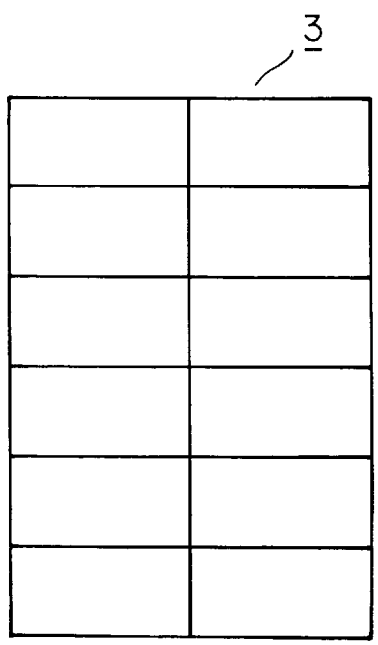
FIG. 18 is a diagram showing the state of the touch panel of the cooking apparatus of the second embodiment after the completion of checking.

In the touch panel check mode, as shown in FIG. 17, at the center of the individual regions 51 to 62 on the touch panel 3, rectangular display check marks 64 to 75 are displayed on the display panel 9. When an input operation is performed in one of the regions 51 to 62, the check mark corresponding to the region in which the input operation has been performed is erased. When input operations are performed in all of the regions 51 to 62, all of the check marks 64 to 75 are erased as shown in FIG. 18.

In this way, it is possible to check the correspondence between the regions on the touch panel 3 and what is displayed on the display panel 9. When the checking of all the regions 51 to 62 on the touch panel 3 has been completed, the operation flow proceeds to step S7, where a function check mode for checking the input/output status of other keys is started.

If, in step S4, the "FULL THAWING" key is not pressed and instead the "SAKE" key is pressed, the microcomputer 6, through the printed circuit board 5, recognizes this flow of operations (step S6) and starts the function check mode (step S7).

In this way, the touch panel check mode for checking the touch panel 3 and the display panel 9 can be started by simple key operation. This helps enhance productivity. Moreover, the function check mode makes it possible to detect defective assembly of the operation panel 1 and of the control circuit board. Note that the number of items from which selection is allowed on the touch panel 3 is not limited to any specific number used in the embodiment described above.

Moreover, in this embodiment, by pressing the "CANCEL" key on the operation panel 1 twice consecutively, it is possible to start a data entry inhibition mode in which no input operation is accepted from any of the independently operated entry keys 4 nor from any boundary FIG. 43 on the touch panel 3. This helps prevent the entry keys 4 and the like from being unnecessarily operated, and makes it possible to clean the surface of the operation panel 1 with a wet cleaning cloth. In this mode, it is preferable to display on the touch panel 3 an indication such as "data entry inhibition mode" or "cleaning under way", or a message telling how to cancel the data entry inhibition mode.

It is also possible to provide a separate "CLEANING" key that is pressed to start a cleaning mode. To cancel the "CLEANING" mode, for example, the "CANCEL" key is pressed twice consecutively; alternatively, a boundary FIG. 43 displayed on the touch panel 3 or the "CLEANING" key is pressed twice consecutively. Whichever key is used, it is preferable that the key be pressed twice to cancel the cleaning mode, because it is very likely that the key will be pressed once during cleaning.

What is claimed is:

1. A cooking apparatus having a display unit and a selector for selecting an item displayed on the display unit, the display unit displaying one screen after another so as to correspond to one item after another selected thereon, comprising:

a bookmark attachment requesting member for requesting attachment of a bookmark to a specific screen displayed on the display unit;

a memory for storing data related to the bookmarked screen;

a bookmarked screen display requesting member for requesting display of the bookmarked screen; and a display controller for displaying the bookmarked screen in accordance with the data stored in the memory in response to a request from the bookmarked screen display requesting member.

2. The cooking apparatus of claim 1, wherein a single member is shared as both the bookmark attachment requesting member and the bookmarked screen display requesting member, and a signal output from the single member when the specific screen is displayed on the display unit is used as a signal that requests attachment of the bookmark.

3. The cooking apparatus of claim 1, wherein an indication symbol is displayed on the bookmarked screen to indicate that the screen is bookmarked.

4. The cooking apparatus of claim 1, wherein the bookmarked screen display requesting member is operated to display a list of titles of bookmarked screens and the selector is operable to select and display one of the bookmarked screens included in the list.

5. A cooking apparatus having a display unit and a selector for selecting an item displayed on the display unit, the display unit displaying one screen after another so as to correspond to one item after another selected thereon, comprising:

an index key for displaying, as items displayed on the display unit, a list of names of groups into which cooking menus are classified by a first letter of the cooking menus; and a display controller for displaying a list of cooking menus belonging to a group selected by the selector.

6. A cooking apparatus having an operation panel including a display unit and a data entry unit, the data entry unit controlling switching of screens displayed on the display unit, the data entry unit comprising:

data entry keys that are individually operable; and a transparent touch panel laid over a front surface of the display unit for entering cooking conditions, the display unit interactively switching the screens displayed responsive to operation of the touch panel, the touch panel including transparent substrate having a first transparent electrode formed thereon, a flexible transparent film having, a second transparent electrode formed thereon, the transparent film being laid over the transparent substrate and bonded thereto at edges of the transparent substrate, an air layer being formed between the transparent substrate and the transparent film with the first and second transparent electrodes facing each other, a connector for connecting to one end of a key cable the key cable, having a second end connected to a control circuit in the touch panel, and an air passage near the connector for providing an air flow path into and out of the air layer.

7. The cooking apparatus of claim 6, wherein a touch surface of the touch panel is divided into an active area in which a touch is recognized and an inactive area in which a touch is not recognized, the active and inactive areas are assigned differently on different screens displayed on the display unit.

8. The cooking apparatus of claim 7, wherein a boundary figure is displayed around the active area on the touch panel to indicate a boundary of the active area.

9. The cooking apparatus of claim 8, wherein the active area has a larger area than the boundary figure.

10. The cooking apparatus of claim 6, wherein the touch panel is operable with a weaker pressing force than the individually operated data entry keys.

11. The cooking apparatus of claim 6, wherein the control circuit is disposed on a rear surface of the operation panel, a recess in which the touch panel is housed being formed in a front surface of the operation panel and an opening through which the key cable is placed is formed in the recess so that the air passage communicates with a space behind the operation panel through the opening.

12. The cooking apparatus of claim 6, wherein a touch panel check mode for checking data entry from the touch panel and display on the display unit is provided, the touch panel check mode is started by operating the data entry unit in a predetermined manner.

13. The cooking apparatus of claim 12, wherein a function check mode for checking portions of the touch panel different from portions checked in the touch panel check mode is provided, the function check mode being selectable to be started independently Or Subsequently to the touch panel check mode.

14. The cooking apparatus of claim 6, wherein a data entry inhibition mode is provided in which at least a part of the data entry unit is disabled.

15. The cooking apparatus of claim 14, wherein, when the data entry inhibition mode is started an indication indicating that the data entry inhibition mode is in effect is displayed on the display unit.

16. The cooking apparatus of claim 14, wherein, when the data entry inhibition mode is started, a message informing how to cancel the data entry inhibition mode is displayed on the display unit.

17. The cooking apparatus of claim 14, wherein the data entry inhibition mode is used as a cleaning mode.

18. A method of displaying bookmarked screens on a display unit of a cooking apparatus, comprising the steps of:

a) displaying one screen after another responsive to selection of items on the screens;

b) attaching a bookmark to specific screens responsive to bookmark requests;

c) storing data related to the bookmarked screens; and d) displaying the bookmarked screens in accordance with the stored data responsive to bookmarked screen display requests.

19. The method of displaying bookmarked screens of claim 18, wherein said step d) comprises displaying an indication symbol on the bookmarked screens indicative that the screens are bookmarked.

20. The method of displaying bookmarked screens of claim 18, wherein said step d) comprises displaying a list of bookmarked screens responsive to a bookmarked screen display request and displaying bookmarked screens responsive to selection from the list.

21. A method of displaying cooking menus on a display unit of a cooking apparatus, comprising the steps of:

a) displaying one screen after another responsive to selection of items on the screens;

b) displaying a list of names of groups into which cooking menus are classified by a first letter of the cooking menus, responsive to an index display request; and c) displaying a list of cooking menus belonging, to a selected group responsive to selection from the list of names of groups.

22. The method of displaying cooking menus of claim 21, further comprising the step of:

d) displaying a selected cooking menu responsive to selection from the list of cooking menus.

23. The method of displaying cooking, menus of claim 21, wherein said step b) comprises displaying the list of names of groups alphabetically.

* * * * *